(12) United States Patent
Barnes

(10) Patent No.: US 10,405,503 B2
(45) Date of Patent: Sep. 10, 2019

(54) TRELLIS COMPONENT

(71) Applicant: NZ TUBE MILLS LIMITED, Lower Hutt (NZ)

(72) Inventor: Paul Barnes, Lower Hutt (NZ)

(73) Assignee: NZ TUBE MILLS LIMITED, Lower Hutt (NZ)

( * ) Notice: Subject to any disclaimer, the term of this patent is extended or adjusted under 35 U.S.C. 154(b) by 168 days.

(21) Appl. No.: 15/624,752

(22) Filed: Jun. 16, 2017

(65) Prior Publication Data

US 2017/0359970 A1 Dec. 21, 2017

(51) Int. Cl.
*A01G 17/00* (2006.01)
*A01G 17/06* (2006.01)
*A01G 17/02* (2006.01)

(52) U.S. Cl.
CPC .............. *A01G 17/06* (2013.01); *A01G 17/02* (2013.01)

(58) Field of Classification Search
CPC ........ A01G 17/00; A01G 17/02; A01G 17/10; A01G 17/14; A01G 17/04; A01G 17/06; A01G 2017/065
See application file for complete search history.

(56) References Cited

U.S. PATENT DOCUMENTS

| 4,023,307 | A | * | 5/1977 | Clark | ..................... | A01G 17/06 |
| | | | | | | 174/163 R |
| 4,536,989 | A | * | 8/1985 | Caywood | ............... | A01G 17/06 |
| | | | | | | 47/46 |
| 4,620,389 | A | * | 11/1986 | Coulson | ................. | A01G 17/06 |
| | | | | | | 47/46 |
| 4,625,454 | A | * | 12/1986 | Daniell | .................. | A01G 17/06 |
| | | | | | | 47/44 |
| 5,144,768 | A | * | 9/1992 | Hiyama | ................. | A01G 17/06 |
| | | | | | | 47/4 |
| 5,630,292 | A | * | 5/1997 | Heinz | ..................... | A01G 17/06 |
| | | | | | | 47/46 |
| 5,711,107 | A | * | 1/1998 | Louisiana | .............. | A01G 9/124 |
| | | | | | | 47/45 |
| 2003/0097788 | A1 | * | 5/2003 | Pierce, Jr. | .............. | A01G 17/06 |
| | | | | | | 47/47 |

(Continued)

FOREIGN PATENT DOCUMENTS

| DE | 4124438 A1 * | 1/1993 | ............. A01G 17/06 |
| DE | 102013013608 A1 * | 2/2015 | ............. A01G 17/06 |

(Continued)

OTHER PUBLICATIONS

First Examination Report dated Jul. 20, 2016, NZ Application No. 721326, pp. 1-4.

(Continued)

*Primary Examiner* — Monica L Williams
*Assistant Examiner* — Aaron M Rodziwicz
(74) *Attorney, Agent, or Firm* — MH2 Technology Law Group LLP

(57) ABSTRACT

A trellis component includes a tubular portion, a connector adapted to be inserted within an upper end of the tubular portion, at least two support arms, and a crop line, which are arranged such that the connector is within the upper end of the tubular portion, the arms are within and extend outwardly from the connector, and the crop line is supported by the arms in an elevated disposition to in turn support a crop.

10 Claims, 5 Drawing Sheets

(56) References Cited

U.S. PATENT DOCUMENTS

| | | | | |
|---|---|---|---|---|
| 2003/0101642 A1* | 6/2003 | Parrish | ............ | A01G 17/06 47/46 |
| 2003/0132362 A1* | 7/2003 | Miller | ............ | A01G 29/00 248/530 |
| 2005/0252076 A1* | 11/2005 | Schloesser | ............ | A01G 17/06 47/46 |
| 2011/0154731 A1* | 6/2011 | Schaeffer | ............ | A01G 17/06 47/45 |
| 2013/0000187 A1* | 1/2013 | Raisacher | ............ | A01G 17/14 47/46 |
| 2013/0139435 A1* | 6/2013 | Harrod | ............ | A01G 9/124 47/46 |
| 2018/0288951 A1* | 10/2018 | Di Battista | ............ | A01G 17/06 |

FOREIGN PATENT DOCUMENTS

| | | | | |
|---|---|---|---|---|
| EP | 2468089 A1 | 6/2012 | | |
| NZ | 585727 A | 8/2010 | | |
| WO | WO-2017072677 A1 * | 5/2017 | ............ | A01G 9/12 |

OTHER PUBLICATIONS

Further Examination Report dated Oct. 18, 2016, NZ Application No. 721326, pp. 1-4.
Further Examination Report dated Mar. 1, 2017, NZ Application No. 721326, pp. 1-4.
Further Examination Report dated Jul. 3, 2017, NZ Application No. 721326, pp. 1-2.
Further Examination Report Acceptance dated Jul. 4, 2017, NZ Application No. 721326, 1 page.

* cited by examiner

TRELLIS COMPONENT

FIELD OF INVENTION

This invention relates to a trellis component. A preferred form of the invention relates to a trellis component for wires used for supporting vines, although it should be understood that the invention is not limited to this.

BACKGROUND

It is known to use posts with arms attached to hold a series of wires in an elevated disposition for supporting growing vines in a vineyard. It is a problem in some vineyards that it can be difficult to attach the arms to the posts in a way which provides sufficient strength to the arms. Also, in cases where the wires attach directly to the arms it can be difficult to remove the wires to enable the vines to be pruned. It is an object of a preferred form of the invention to go at least some way towards addressing these problems. While this applies to the preferred embodiment, it should be understood that the object of the invention per se is simply to provide the public with a useful choice. The object of the preferred embodiment should not be seen as a limitation of any claims that do not address that object.

SUMMARY

In a first aspect of the invention there is provided a trellis component having a tubular portion, a connector adapted to be inserted within an upper end of the tubular portion, at least two support arms, and a crop line, arranged such that the connector is within the upper end of the tubular portion, the arms are within and extend outwardly from the connector, and the crop line is supported by the arms in an elevated disposition to in turn support a crop.

Optionally, the connector comprises a cap and a downwardly extending skirt, the skirt having a pair of aligned openings, and wherein a fixing member (e.g. a bolt) passes through the tubular portion and both openings to fix the connector with respect to the tubular portion.

Optionally, the fixing member also passes through one or more of the support arms to fix them with respect to the connector.

Optionally, the tubular portion is in the form of a post.

Optionally, the connector fits within the post.

Optionally, the arms are in a substantially V-shaped formation.

Optionally, the trellis component comprises a plurality of clips fastened to the arms.

Optionally, the connector is substantially metallic.

Optionally, the tubular portion is substantially metallic.

Optionally, the arms are substantially metallic.

Optionally, the trellis component comprises a cross piece with clips attached supporting one or more crop lines.

Optionally, a lateral brace extends from one arm to another.

Optionally, the lateral brace comprises a wire.

Optionally, a vertically oriented extension proceeds from the connector and supports one or more crop lines.

Optionally, clips are fastened to the extension.

Optionally, the crop line/s supported by the extension is/are fastened to the extension by way of clips.

BRIEF DESCRIPTION OF THE DRAWINGS

Some preferred embodiments of the invention will now be described by way of example and with reference to the accompanying drawings, of which.

DETAILED DESCRIPTION

Figure 1:
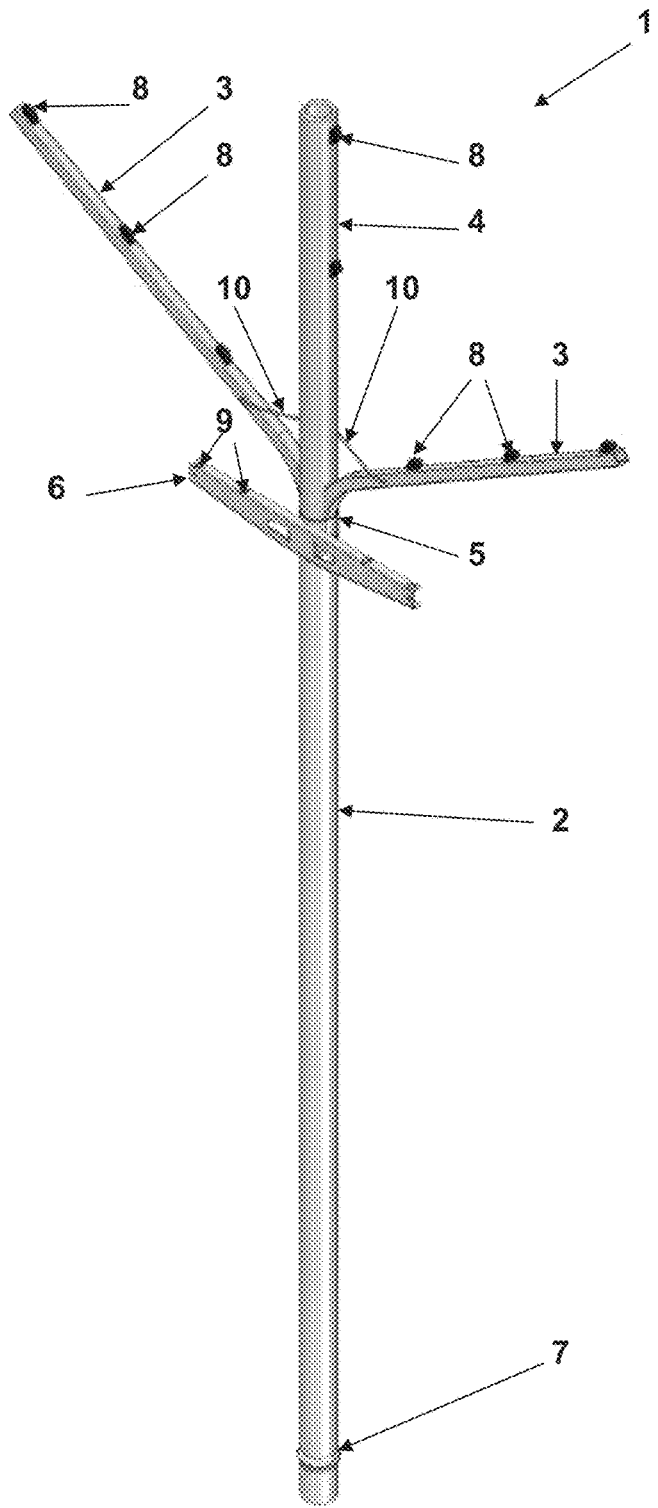
FIG. 1 is a perspective view of a trellis component.
Figure 2:
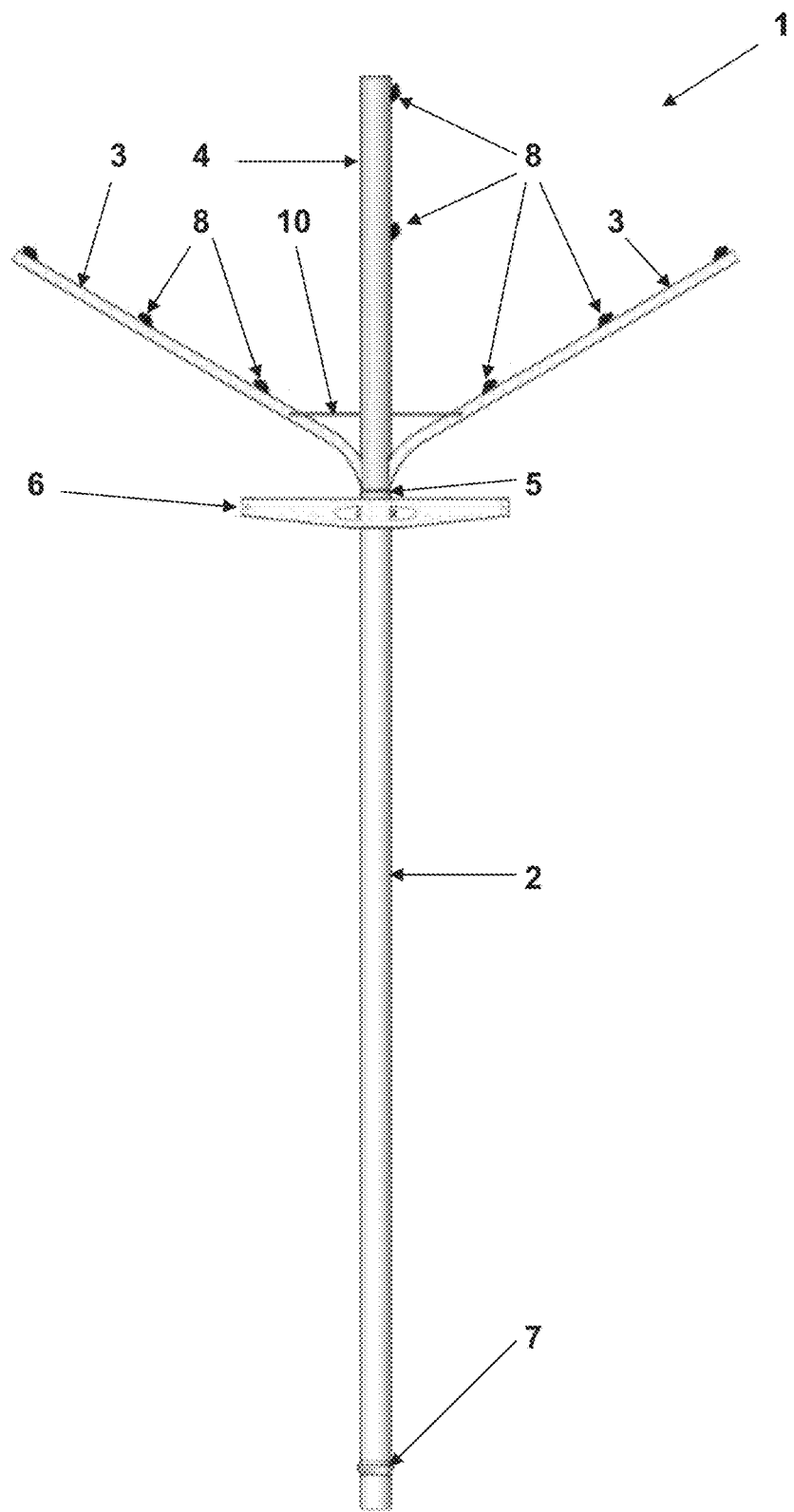
FIG. 2 is a front view of the trellis component.

Referring to FIGS. 1 and 2, a trellis component 1 is provided for retaining wires for supporting growing grape vines or other horticultural products. The trellis component 1 comprises an open-ended tubular post 2, a pair of arms 3, a tubular vertical extension 4, a connector 5 (not visible in FIGS. 1 and 2, but shown in FIGS. 3 and 4), and a cross bracket 6.

Figure 5:
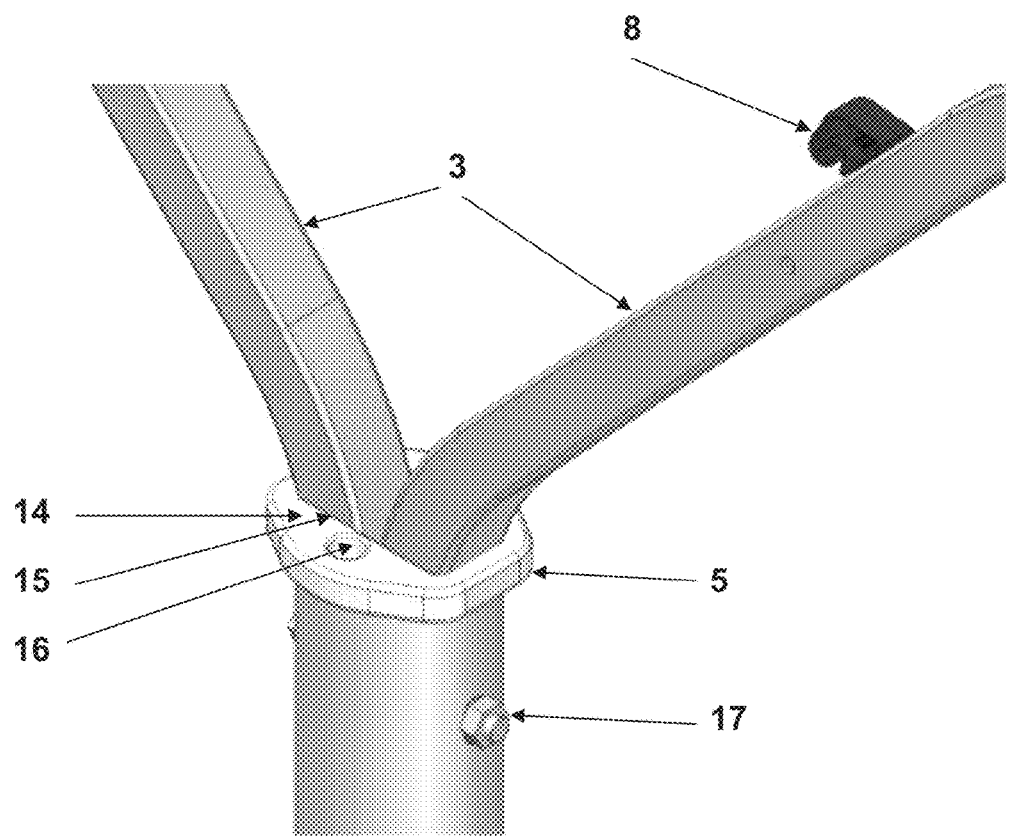
FIG. 5 is a close-up partial view of an alternative embodiment of the connector when set in place.

The post 2 has upper bolt holes (as indicated in FIG. 5) at its upper end, and a lower bulge 7. The bolt holes are for receiving a bolt to secure the arms 3 to the post 2. When in use the bulge 7 is below ground level and resists upward pulling forces.

Each arm 3 has a lower curved part where it feeds into the connector 5. These lower curved parts of the arms have holes aligned with those of the post 2 so that the same bolt can pass through them. The arms 3 have clip apertures on an upper side adapted to receive and hold a plurality of clips 8. The base of each clip is inserted into a corresponding aperture and the clip turned through 90 degrees to cause it to lock in place in a cam fit. The clips may be as described in published NZ patent specification number 585727.

The cross bracket 6 also has apertures 9 able to receive clips 8 and is positioned just below the arms 3. The post 2, arms 3, and cross bracket 6 are preferably made of galvanised steel although they may be made of any other suitable material, for example aluminium or titanium.

The extension 4 also has apertures adapted to receive and hold clips 8. A supporting line 10 is attached to the front of each of the arms 3 and runs around the back of the extension 4 for bracing the trellis component. This provides additional support, although it is not essential.

Figure 3:
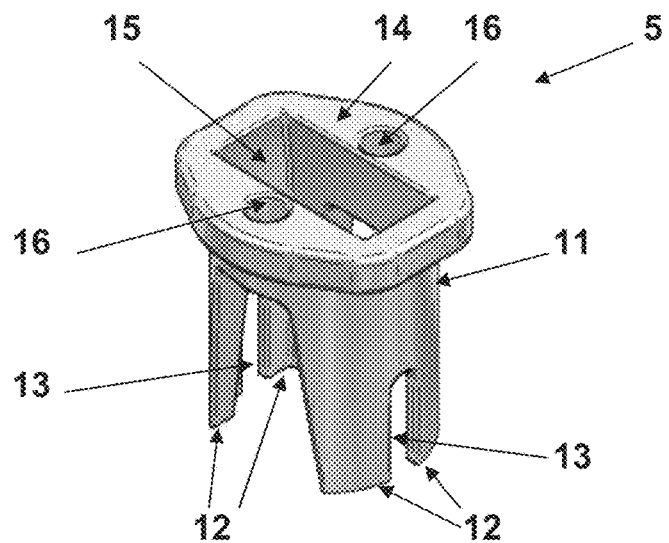
FIG. 3 is a perspective view of a connector forming part of the trellis component.
Figure 4:
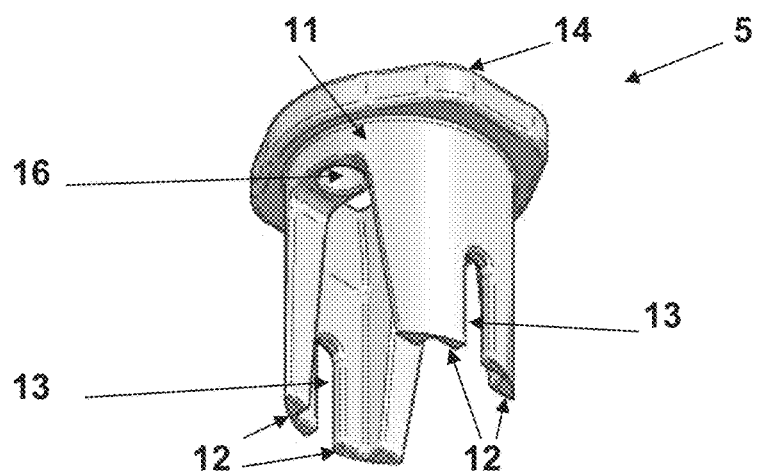
FIG. 4 is an alternative perspective view of the connector.

Referring to FIGS. 3 and 4, the connector 5 has a skirt 11 with two pairs of leg-like projections 12 and a recess 13 between each pair. The connector also has a cap 14 with a rectangular opening 15 sized to receive the lower ends of the two arms 3. Optional holes 16 in the cap 14 are adapted to receive an irrigation bracket (not shown) for holding a hose or water pipe.

To assemble the trellis component 1, the post 2 is first installed in the ground. The connector 5 is then placed in the top end of the post 2 so that the skirt 11 fits snugly within, and only the cap 14 protrudes. The curved lower end of each arm 3 is placed within the rectangular opening 15, as can be seen in FIG. 5. A bolt 17 is passed through the aperture in the upper part of the post 2, through each connector recess 13, and through the hole at the lower end of each arm 3. A nut secures the bolt 17 and the arms 3 to the post 2.

The extension 4 is then fitted to the post 2 over the arms 4, the supporting line 10 fitted, and the bracket 6 is attached, although these are optional features. The vertical extension 4 and cross bracket 6 may be used if additional wires are required, depending on the size of the vines. The extension 4 is also useful for supporting a frost protection canopy over fruiting vines.

Figure 6:
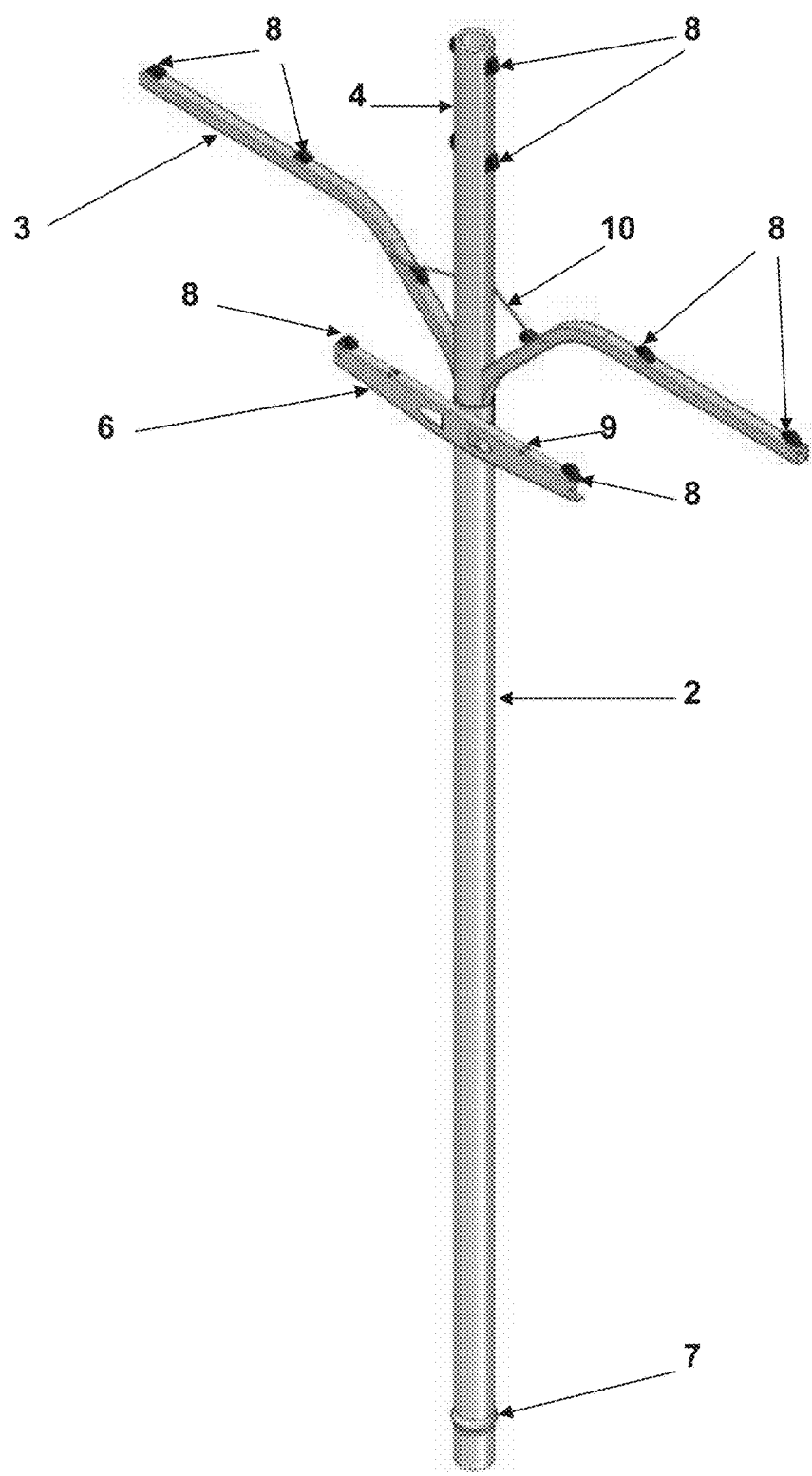
FIG. 6 illustrates an alternative embodiment of the trellis component.

The curved shape of the arms 3 means that when assembled the trellis component 1 is substantially V-shaped. Referring to FIG. 6, in an alternative embodiment of the invention the arms 3 are shaped so that when assembled the trellis component 1 is substantially T-shaped.

In use, a row of trellis components 1 is installed as described above to form a trellis. Each row supports a series of wires at differing heights. A wire may be placed in clips 8 set at the same height to run along the row of trellis components parallel to the ground. There will usually be multiple wires running along the row. Table grape vines, or other horticultural products, grow along the wires. At the end of the grape growing season the grapes are harvested. The wires are then removed from the clips 8 so that the vines growing on them can be pruned back in readiness for the next growing season.

In some embodiments of the invention the arms may be permanently joined to one another, for example by welding before they are inserted into the connector 5. Even if joined, they may be regarded as arms (plural), not one arm.

While some preferred embodiments of the invention have been described by way of example it should be appreciated that modifications and improvements can occur without departing from the scope of the following claims.

What we claim is:

1. A trellis component having:
   a tubular portion;
   a connector adapted to be inserted within an upper end of the tubular portion, the connector comprising a cap and a downwardly extending skirt, the skirt having a pair of aligned openings;
   at least two support arms; and
   a crop line,
   arranged such that the connector is within the upper end of the tubular portion, the arms are within and extend outwardly from the connector, wherein a fixing member passes through the tubular portion and both openings to fix the connector with respect to the tubular portion and wherein the fixing member also passes through one or more of the support arms to fix them with respect to the connector and the crop line is supported by the arms in an elevated disposition to in turn support a crop.

2. A trellis component according to claim 1, wherein the tubular portion is in the form of a post.

3. A trellis component according to claim 1, wherein the tubular portion is in the form of a post and where the connector fits within the post.

4. A trellis component according to claim 1, wherein the arms are in a substantially V-shaped formation.

5. A trellis component according to claim 1, wherein the arms are in a substantially T-shaped formation.

6. A trellis component according to claim 1, comprising a plurality of crop line clips fastened to the arms and wherein the arms, the connector and the tubular portion are each substantially metallic.

7. A trellis component according to claim 1, comprising a cross piece with clips attached supporting one or more crop lines.

8. A trellis component according to claim 1, wherein a lateral brace extends from one arm to another and wherein the lateral brace comprises a wire.

9. A trellis component according to claim 1, comprising a vertically oriented extension proceeding from the connector and supporting one or more crop lines wherein clips are fastened to the extension and wherein the crop line/s is/are fastened to the extension by way of clips.

10. A trellis component having:
    a tubular portion in the form of a post;
    a connector adapted to be inserted within an upper end of the tubular portion, the connector comprising a cap and a downwardly extending skirt, the skirt having a pair of aligned openings;
    at least two support arms;
    a cross piece with clips attached; and
    one or more crop lines,
    arranged such that the arms are within and extend outwardly from the connector, the connector is within the upper end of the tubular portion, a fixing member passes through the tubular portion and the support arms and both openings to fix the connector with respect to the tubular portion and the support arms, and the one or more crop lines are supported by the arms and the cross piece clips in an elevated disposition to in turn support a crop.

* * * * *